Aug. 20, 1929.  J. MORGENSTERN  1,725,293
SWITCH BOX OR RECEPTACLE
Filed March 31, 1924
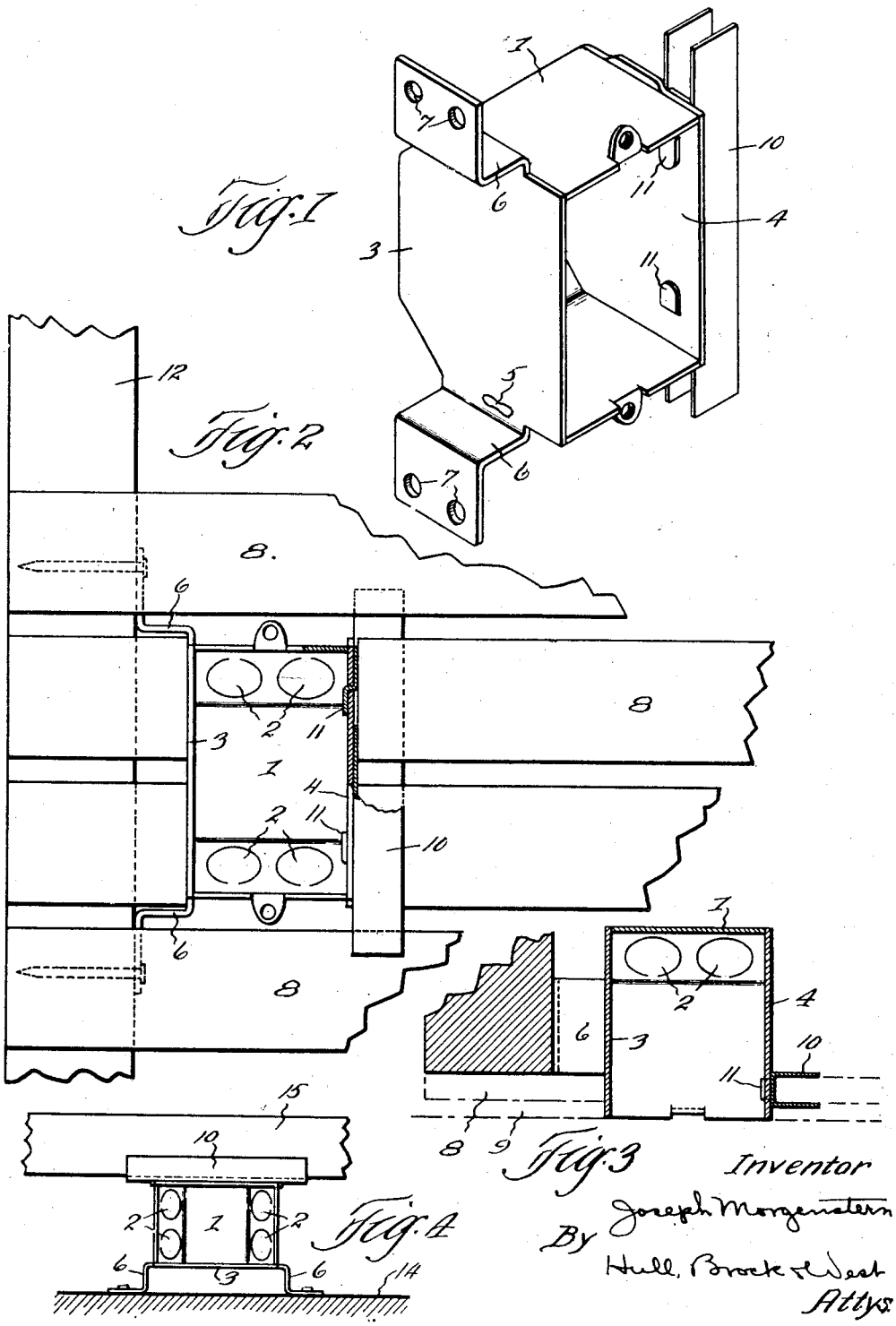

Patented Aug. 20, 1929.

1,725,293

UNITED STATES PATENT OFFICE.

JOSEPH MORGENSTERN, OF CLEVELAND, OHIO.

SWITCH BOX OR RECEPTACLE.

Application filed March 31, 1924. Serial No. 703,085.

This invention relates to an improved switch box or receptacle for use in the electric wiring of buildings, and it has for its primary purpose to so design and construct the box that its installation is greatly facilitated and improved.

In carrying out my invention I provide the switch box or receptacle with brackets which are so shaped and positioned with respect to the open front of the box that the workman may attach the brackets to the side of a stud or joist in a given relation thereto without measurement or calculation and with the assurance that the face of the box or receptacle will be flush with the surface of the plaster coat when the job is finally lathed and plastered. I am aware that boxes having attaching lugs are old but in those cases wherewith I am familiar the lugs are applied to the face of the stud and this interferes at times with the nailing of the laths to the stud in the immediate vicinity of the box. Furthermore, with such prevailing types of boxes, it is usually necessary to provide a vertical member which is opposed to the stud for the attachment of the ears projecting from the side of the box opposite the stud. In my arrangement, the box is very securely fastened at one side to the stud and at the other side is supported by several laths which interengage with a part of the box or receptacle.

The foregoing and other advantages will be apparent from the following detailed description of my invention, reference being had to the accompanying drawing wherein Fig. 1 is a perspective view of my improved switch box or receptacle; Fig. 2 shows the box in front elevation attached to a stud and surrounded by laths; Fig. 3 is a horizontal sectional view through the box and the adjacent part of a stud; and Fig. 4 shows the box installed as a base receptacle.

The box is preferably constructed of sheet metal and comprises a body portion 1 which is a substantially U-shaped member having the usual "knockouts" 2 for the reception of the conduits through which the electric wires are led into the box, and side plates 3 and 4 are secured to the opposite sides of the body portion in any suitable manner as by the well known method of extending lugs of the body portion through apertures in the side plates and riveting them over, as indicated at 5 in Fig. 1.

Brackets 6 are formed integral with the side plate 3 and project laterally therefrom a given distance and then in opposite directions in the same plane, while the end portions of the brackets are provided with apertures 7. The brackets 6 are offset rearwardly from the front of the box a distance substantially equal to the aggregate thickness of the laths and plaster, as appears from Fig. 3 where the laths are designated 8 and the plaster 9.

Secured to the side plate 4 is a channel member 10, said member being in the plane of the laths when the box is installed. This is also best shown in Fig. 3. The channel member is conveniently and cheaply secured to the plate 4 by extending lugs 11 that are struck from the web of the channel through slots in the plate 4 and turning them over on the inner side of the plate. This will be clear from an inspection of Fig. 2. The web of the channel terminates short of the opposite ends of its side flanges. This is to permit laths extending across the top of and beneath the box to be engaged between the flanges.

In installing the switch box within a wall, the workman engages the brackets 6 with the side of a stud 12 and with the front edges of the brackets flush with the front surface of the stud. He then drives nails or screws through the apertures 7 into the stud for securing the box in place. The box, so attached to the stud, does not interfere with the placement of the laths 8. As previously stated, the laths above and below the box are engaged between the side flanges of the channel 10, and those meeting the box on the side opposite the stud 12 have their ends engaged within the channel 10. The laths on the opposite side may extend to the side plate 3. This gives a practically uninterrupted supporting surface for the plaster 9 which is laid on to a thickness equal to the distance between the front surface of the laths and the front of the box.

When using the box as a base receptacle it is turned on its side with the brackets 6 downward for engagement with the floor designated 14 in Fig. 4; and the lowermost lath, designated 15, may repose within the channel 10.

It is obvious without additional illustration that my improvements may be incorporated in so-called "gang" receptacles. Such a receptacle may be produced by merely lengthening the body portion and thus increasing the distance between the side plates so that a plurality of switches or sockets may be housed within the box or receptacle.

Having thus described my invention, what I claim is:—

1. An open front receptacle of the character set forth having brackets extending laterally from one side and spaced rearwardly from its open front a distance substantially equal to the standard aggregate thickness of laths and plaster, said brackets terminating in attaching faces that are substantially parallel to the adjacent side of the receptacle, and a channel member secured to the opposite side of the box for the reception of the ends of laths, the side flanges of the channel member extending above and below the receptacle so that laths extending across the top of and beneath the receptacle may be engaged between said flanges.

2. An outlet box of the character described having brackets extending laterally from one side and spaced from the outer face thereof a distance substantially equal to the standard aggregate thickness of laths and plaster, said brackets terminating in attaching faces substantially parallel to the adjacent side of the box, a channel member secured to the opposite side of the box for the reception of the ends of laths, said channel member extending above and below the box whereby the laths may extend through the channel member and across the top and beneath the bottom of the box, the outer face of said channel member being spaced from the front of the box a distance substantially equal to the standard thickness of plaster.

3. A switch box of the character described adapted for attachment to the side face of a stud, brackets extending laterally from one side of the box a predetermined distance so as to space the box from the stud such a distance as to allow for a window or door facing of standard width, the said brackets being spaced from the outer face of the box a distance substantially equal to the standard aggregate clearance of laths and plaster, said brackets terminating in attaching faces substantially parallel with the adjacent side face of the box, a channel member secured to the opposite side of the box for the reception of the ends of laths, said channel member extending above and below the box whereby the laths may extend through the channel member and across the top and beneath the bottom of the box, the outer face of said channel member being spaced from the front of the box a distance substantially equal to the standard thickness of plaster.

In testimony whereof, I hereunto affix my signature.

JOSEPH MORGENSTERN.